(12) United States Patent
Matzner et al.

(10) Patent No.: US 8,870,233 B2
(45) Date of Patent: Oct. 28, 2014

(54) SWIVEL JOINT WITH UNIFORM BALL BEARING REQUIREMENTS

(75) Inventors: Mark D. Matzner, Burleson, TX (US); Brian C. Witkowski, Weatherford, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 1255 days.

(21) Appl. No.: 12/165,680

(22) Filed: Jul. 1, 2008

(65) Prior Publication Data

US 2009/0008934 A1 Jan. 8, 2009

Related U.S. Application Data

(60) Provisional application No. 60/947,738, filed on Jul. 3, 2007.

(51) Int. Cl.
*F16L 27/08* (2006.01)
*F16C 19/08* (2006.01)
*F16C 43/06* (2006.01)

(52) U.S. Cl.
CPC ............ *F16L 27/0828* (2013.01); *F16C 19/08* (2013.01); *F16C 43/06* (2013.01); *F16L 27/0845* (2013.01); *F16C 2240/84* (2013.01)
USPC ........................................................ 285/276

(58) Field of Classification Search
USPC ............ 384/504, 512, 513; 285/98, 276, 275, 285/278, 281
See application file for complete search history.

(56) References Cited

U.S. PATENT DOCUMENTS

| 345,420 | A |   | 7/1886 | Eskholme et al. |
|---|---|---|---|---|
| 375,464 | A |   | 12/1887 | Thacher et al. |
| 580,226 | A |   | 4/1897 | Sanford |
| 741,477 | A |   | 10/1903 | Flinn |
| 1,201,022 | A |   | 10/1916 | Conniff |
| 1,379,092 | A |   | 5/1921 | Fraccascia |
| 1,452,603 | A | * | 4/1923 | Himes .......................... 384/513 |
| 1,473,634 | A |   | 11/1923 | Loudon |
| 1,483,001 | A |   | 2/1924 | Kurre |
| 1,488,211 | A |   | 3/1924 | Loeffler |

(Continued)

FOREIGN PATENT DOCUMENTS

| AU | 649744 B2 | 6/1994 |
|---|---|---|
| AU | 348253 | 5/2013 |

(Continued)

OTHER PUBLICATIONS

SPM Flow Control, Inc., "Flow Control Products and Drilling Equipment for the Worldwide Petroleum Industry", Date: Jan. 8, 2007.*

(Continued)

*Primary Examiner* — Daniel P Stodola
*Assistant Examiner* — James Linford
(74) *Attorney, Agent, or Firm* — Gardere Wynne Sewell LLP

(57) ABSTRACT

A swivel joint has uniform ball bearing requirements for all bearing races. The swivel joint has a male connector and a female connector that coaxially interconnect and swivel relative to each other. Each connector has three bearing races to form three sets of bearing races, each of which supports that same number of ball bearings. The circumference of the main set of races are enlarged by less than the diameter of one ball.

1 Claim, 4 Drawing Sheets

(56) References Cited

U.S. PATENT DOCUMENTS

| | | | |
|---|---|---|---|
| 1,543,637 A | 6/1925 | Woll |
| 1,607,463 A | 11/1926 | Kent |
| 1,664,493 A | 4/1928 | Smith |
| 1,675,808 A | 7/1928 | Kliss |
| 1,764,936 A | 6/1930 | Dean |
| 1,798,498 A | 3/1931 | Riley |
| 1,889,256 A | 11/1932 | Lipscomb |
| 1,990,090 A | 2/1935 | Packard |
| 2,197,320 A | 4/1940 | Shenton |
| 2,310,583 A | 2/1943 | Johnson |
| 2,310,813 A | 2/1943 | Sellmeyer |
| 2,339,287 A | 1/1944 | Neef, Jr. |
| 2,354,161 A | 7/1944 | Waterman |
| 2,361,881 A | 10/1944 | Sheppard |
| 2,391,266 A | 12/1945 | Parker |
| 2,404,142 A | 7/1946 | Parker |
| 2,506,162 A | 5/1950 | Metzgar |
| 2,587,212 A | 2/1952 | Placette |
| 2,606,068 A | 8/1952 | Bonacor |
| 2,694,503 A | 11/1954 | Young |
| 2,717,001 A | 9/1955 | Perrault |
| 2,746,773 A | 5/1956 | Bily |
| 2,766,999 A | 10/1956 | Watts |
| 2,795,459 A | 6/1957 | Cornelius |
| 2,923,317 A | 2/1960 | McInerney |
| 3,024,047 A | 3/1962 | Schmohl |
| 3,060,961 A | 10/1962 | Conley |
| 3,064,940 A | 11/1962 | Anderson |
| 3,072,379 A | 1/1963 | Hamer |
| 3,113,792 A | 12/1963 | Brown |
| 3,150,681 A | 9/1964 | Hansen |
| 3,160,426 A | 12/1964 | Faeser |
| 3,204,484 A | 9/1965 | Gustafson et al. |
| 3,216,746 A | 11/1965 | Watts |
| 3,241,567 A | 3/1966 | Pusch |
| 3,294,425 A | 12/1966 | Franck |
| 3,341,232 A | 9/1967 | Deakins |
| 3,343,802 A | 9/1967 | Schuilwerve |
| 3,346,002 A | 10/1967 | Thompson, Jr. et al. |
| 3,357,679 A | 12/1967 | Gulick |
| 3,403,931 A | 10/1968 | Crain |
| 3,425,661 A | 2/1969 | Mayo |
| 3,439,897 A | 4/1969 | Priese |
| 3,455,534 A | 7/1969 | Scaramucci |
| 3,467,224 A | 9/1969 | Curtis |
| 3,472,479 A | 10/1969 | Sherwood |
| 3,554,581 A | 1/1971 | Mason |
| 3,556,474 A | 1/1971 | Scaramucci |
| 3,561,727 A | 2/1971 | Scaramucci |
| 3,571,896 A | 3/1971 | Wilkerson |
| 3,594,835 A | 7/1971 | Wilson |
| 3,630,483 A | 12/1971 | Canalizo |
| 3,680,188 A | 8/1972 | Mason et al. |
| 3,687,415 A | 8/1972 | Turkot |
| 3,712,585 A | 1/1973 | Grenier |
| 3,726,314 A | 4/1973 | Moen |
| 3,789,872 A | 2/1974 | Elliott |
| 3,813,733 A | 6/1974 | Flohr |
| 3,840,048 A | 10/1974 | Moen |
| 3,845,876 A | 11/1974 | Needham et al. |
| 3,881,480 A | 5/1975 | LaFourcade |
| 3,894,718 A | 7/1975 | Koch et al. |
| 3,916,950 A | 11/1975 | Mongerson et al. |
| 3,933,172 A | 1/1976 | Allen |
| 3,934,608 A | 1/1976 | Guyton |
| 3,937,240 A | 2/1976 | Nanny |
| 3,942,551 A | 3/1976 | Schuller et al. |
| 3,967,842 A * | 7/1976 | Kendrick ..................... 285/276 |
| 3,972,364 A | 8/1976 | Brumm |
| 3,974,848 A | 8/1976 | Wheatley |
| 4,027,696 A | 6/1977 | Guyton |
| 4,046,164 A | 9/1977 | Pool |
| 4,059,872 A | 11/1977 | Delesandri |
| 4,085,770 A | 4/1978 | Woronowicz |
| 4,086,803 A | 5/1978 | Wheeler |
| 4,093,180 A | 6/1978 | Strabala |
| 4,113,228 A | 9/1978 | Frye |
| 4,150,847 A | 4/1979 | De Cenzo |
| 4,171,095 A | 10/1979 | Filan et al. |
| 4,218,080 A | 8/1980 | Kendrick |
| 4,221,204 A | 9/1980 | Meyer |
| 4,254,793 A | 3/1981 | Scaramucci |
| 4,261,387 A | 4/1981 | Cohn |
| 4,274,434 A | 6/1981 | Hafele |
| 4,321,945 A | 3/1982 | Chabat-Courrede |
| 4,327,768 A | 5/1982 | Behle |
| 4,332,370 A | 6/1982 | Williams |
| 4,338,707 A | 7/1982 | Byerly |
| 4,367,571 A | 1/1983 | Speirs et al. |
| 4,378,849 A | 4/1983 | Wilks |
| 4,399,830 A | 8/1983 | Brodie |
| 4,445,255 A | 5/1984 | Olejak |
| 4,448,148 A | 5/1984 | Gain, Jr. |
| 4,478,388 A | 10/1984 | George |
| 4,485,530 A | 12/1984 | Begley et al. |
| 4,485,843 A | 12/1984 | Wolff |
| 4,497,344 A | 2/1985 | Kisiel |
| 4,501,291 A | 2/1985 | Siegrist |
| 4,506,696 A | 3/1985 | Von Pechmann |
| 4,511,120 A | 4/1985 | Conley et al. |
| 4,524,599 A | 6/1985 | Bailey |
| 4,531,542 A | 7/1985 | Looney |
| 4,597,505 A | 7/1986 | Mozley et al. |
| 4,605,036 A | 8/1986 | Smith et al. |
| 4,616,803 A | 10/1986 | Schils |
| 4,667,570 A | 5/1987 | Jensen, Jr. et al. |
| 4,705,306 A | 11/1987 | Guido et al. |
| 4,716,930 A | 1/1988 | Richmond et al. |
| 4,836,240 A | 6/1989 | Elliott |
| 4,842,014 A | 6/1989 | Strelow et al. |
| 4,848,398 A | 7/1989 | Leach |
| 4,864,696 A | 9/1989 | Mittermaier et al. |
| 4,915,418 A | 4/1990 | Palatchy |
| 4,969,482 A | 11/1990 | Perrin et al. |
| 4,993,489 A | 2/1991 | McLeod |
| 5,056,548 A | 10/1991 | Mills |
| 5,143,112 A | 9/1992 | Scaramucci |
| 5,161,566 A | 11/1992 | Scaramucci |
| 5,161,570 A | 11/1992 | Scaramucci |
| 5,178,185 A | 1/1993 | Stehling et al. |
| 5,307,835 A | 5/1994 | Scaramucci |
| 5,341,840 A | 8/1994 | Manson et al. |
| 5,386,847 A | 2/1995 | Scaramucci |
| 5,417,402 A | 5/1995 | Speybroeck |
| 5,439,027 A | 8/1995 | Layton et al. |
| 5,441,072 A | 8/1995 | Indey et al. |
| 5,443,088 A | 8/1995 | Hoch et al. |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,947,152 A | 9/1999 | Martin et al. |
| 5,957,592 A * | 9/1999 | Yamanaka ..................... 384/526 |
| 5,983,826 A | 11/1999 | Lohde |
| 6,003,837 A | 12/1999 | Raymond, Jr. et al. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | McGuire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,240,951 B1 | 6/2001 | Yori |
| 6,250,605 B1 | 6/2001 | Young |
| 6,290,237 B1 | 9/2001 | Graupner |

(56) References Cited

U.S. PATENT DOCUMENTS

| | | | |
|---|---|---|---|
| 6,361,051 B1 | 3/2002 | Babin | |
| 6,371,527 B1 * | 4/2002 | Ungchusri et al. | 285/276 |
| 6,382,247 B1 | 5/2002 | Gundry | |
| 6,450,477 B1 | 9/2002 | Young | |
| 6,554,024 B2 | 4/2003 | Mefford et al. | |
| 6,554,249 B2 | 4/2003 | Pang et al. | |
| 6,742,538 B1 | 6/2004 | Aderholt et al. | |
| 6,843,265 B2 | 1/2005 | Taylor | |
| 6,854,704 B1 | 2/2005 | Young | |
| 6,880,567 B2 | 4/2005 | Klaver et al. | |
| 6,880,568 B1 | 4/2005 | Taylor | |
| 6,886,593 B2 | 5/2005 | Madden et al. | |
| 6,945,569 B1 | 9/2005 | Diaz et al. | |
| 6,948,526 B2 | 9/2005 | Seder et al. | |
| 6,978,799 B2 | 12/2005 | Kugelev et al. | |
| 7,004,445 B2 | 2/2006 | Lymberopoulos | |
| 7,028,986 B2 | 4/2006 | Young | |
| 7,204,525 B2 | 4/2007 | Matzner | |
| RE39,695 E | 6/2007 | Ungchusri et al. | |
| 7,228,869 B2 | 6/2007 | Wilhelm | |
| 7,264,059 B2 | 9/2007 | Akselberg | |
| 7,302,961 B2 | 12/2007 | Martin et al. | |
| 7,398,796 B2 | 7/2008 | Hjorth et al. | |
| 7,401,819 B2 | 7/2008 | Gibb et al. | |
| 7,451,959 B2 | 11/2008 | Matzner | |
| 7,458,212 B2 | 12/2008 | Koizumi et al. | |
| 7,516,941 B2 | 4/2009 | Combs | |
| 7,549,681 B1 | 6/2009 | Matzner | |
| 7,677,526 B2 | 3/2010 | Lymberopoulos | |
| 7,819,386 B2 | 10/2010 | Combs | |
| 7,823,265 B2 | 11/2010 | Matzner et al. | |
| 7,890,276 B2 | 2/2011 | Killion et al. | |
| 8,000,909 B2 | 8/2011 | Danzy | |
| 8,051,875 B2 | 11/2011 | Edwards | |
| 8,261,771 B2 | 9/2012 | Witkowski et al. | |
| 8,465,001 B2 | 6/2013 | Witkowski et al. | |
| 2002/0185867 A1 | 12/2002 | Stachowiak | |
| 2002/0186910 A1 * | 12/2002 | Maret | 384/513 |
| 2003/0047944 A1 | 3/2003 | Ungchusri et al. | |
| 2003/0178067 A1 | 9/2003 | Fredrickson et al. | |
| 2004/0163716 A1 | 8/2004 | Madden et al. | |
| 2005/0121073 A1 | 6/2005 | Carroll | |
| 2005/0199286 A1 | 9/2005 | Appleford et al. | |
| 2006/0091339 A1 | 5/2006 | Young | |
| 2006/0185731 A1 | 8/2006 | Grable et al. | |
| 2006/0283513 A1 | 12/2006 | Kurian et al. | |
| 2007/0051411 A1 | 3/2007 | Scaramucci et al. | |
| 2007/0262029 A1 | 11/2007 | Yoshida et al. | |
| 2007/0272308 A1 | 11/2007 | Spears et al. | |
| 2008/0054204 A1 | 3/2008 | Zhou | |
| 2008/0196773 A1 | 8/2008 | Franconi | |
| 2008/0308159 A1 | 12/2008 | Stunkard | |
| 2010/0154894 A1 | 6/2010 | Kotapish et al. | |
| 2010/0258200 A1 | 10/2010 | Walker et al. | |
| 2010/0326541 A1 | 12/2010 | Kugelev et al. | |
| 2011/0036415 A1 | 2/2011 | Lymberopoulos | |
| 2011/0240126 A1 | 10/2011 | Lymberopoulos et al. | |
| 2011/0316274 A1 | 12/2011 | Gronlund et al. | |
| 2012/0025114 A1 | 2/2012 | Lymberopoulos et al. | |
| 2012/0031494 A1 | 2/2012 | Lymberopoulos | |
| 2012/0073670 A1 | 3/2012 | Lymberopoulos | |
| 2012/0091743 A1 | 4/2012 | Ohman, III et al. | |
| 2012/0219354 A1 | 8/2012 | Bauer et al. | |
| 2012/0227983 A1 | 9/2012 | Lymberopoulos et al. | |
| 2013/0000745 A1 | 1/2013 | Witkowski et al. | |
| 2013/0020519 A1 | 1/2013 | Lymberopoulos | |
| 2013/0037125 A1 | 2/2013 | Drake et al. | |

FOREIGN PATENT DOCUMENTS

| | | | |
|---|---|---|---|
| CA | 2485817 | A1 | 4/2005 |
| CA | 2490664 | A1 | 10/2005 |
| CA | 2503231 | A1 | 10/2005 |
| CA | 2635751 | A1 | 1/2009 |
| CN | 2118877 | U | 10/1992 |
| CN | 1137309 | A | 12/1996 |
| CN | 1225298 | A | 8/1999 |
| CN | 2426550 | Y | 4/2001 |
| CN | 2901281 | Y | 5/2007 |
| CN | 201043685 | Y | 4/2008 |
| CN | 101205798 | A | 6/2008 |
| CN | 101258350 | A | 9/2008 |
| CN | 101303033 | A | 11/2008 |
| CN | 101367099 | A | 2/2009 |
| CN | 201206648 | Y | 3/2009 |
| CN | 201262043 | Y | 6/2009 |
| CN | 101539218 | A | 9/2009 |
| CN | 101722221 | A | 6/2010 |
| CN | 201496006 | U | 6/2010 |
| CN | 201650157 | U | 11/2010 |
| CN | 201747313 | U | 2/2011 |
| CN | 202047762 | U | 11/2011 |
| CN | 102323158 | A | 1/2012 |
| CN | 202208237 | U | 5/2012 |
| CN | 202255848 | U | 5/2012 |
| DE | 218416 | A1 | 2/1985 |
| DE | 3341643 | A1 | 5/1985 |
| DE | 19707228 | A1 | 8/1998 |
| DE | 102004033453 | A1 | 1/2006 |
| EA | 201171356 | A1 | 5/2012 |
| EM | 002307421-0002 | | 9/2013 |
| EP | 44619 | A1 | 1/1982 |
| EP | 1219942 | A1 | 7/2002 |
| EP | 1488867 | A1 | 12/2004 |
| FR | 2635476 | A1 | 2/1990 |
| GB | 578008 | A | 6/1946 |
| GB | 731895 | A | 6/1955 |
| GB | 1536728 | A | 12/1978 |
| GB | 2056626 | A | 3/1981 |
| GB | 2117822 | A | 10/1983 |
| GB | 2140338 | A | 11/1984 |
| GB | 2185287 | A | 7/1987 |
| GB | 2228885 | A | 9/1990 |
| GB | 2312728 | B | 5/2000 |
| GB | 2355510 | A | 4/2001 |
| GB | 2408562 | A | 6/2005 |
| GB | 2416574 | B | 8/2008 |
| GB | 2413606 | B | 3/2009 |
| GB | 2444822 | B | 6/2011 |
| GB | 2452801 | B | 4/2012 |
| JP | 2008215626 | A | 9/2008 |
| MX | 2011011007 | A | 2/2012 |
| MX | 2011012944 | A | 6/2012 |
| RU | 1466084 | C | 6/1995 |
| RU | 1417281 | C | 7/1995 |
| RU | 02088831 | C1 | 8/1997 |
| RU | 2367770 | C1 | 9/2009 |
| RU | 2367771 | C1 | 9/2009 |
| WO | WO-9713398 | A2 | 4/1997 |
| WO | WO-2010080636 | A2 | 7/2010 |
| WO | WO-2010123889 | A2 | 10/2010 |
| WO | WO-2010141651 | A2 | 12/2010 |
| WO | WO-2010151680 | A2 | 12/2010 |
| WO | WO-2011095453 | A1 | 8/2011 |
| WO | WO-2013023154 | A1 | 2/2013 |

OTHER PUBLICATIONS

SPM Flow Control, Inc., Long Radius Swivel Joints, H2S, Operating and Maintenance Instructions, 1999.
SPM Flow Control, Inc., Swivel Joints, 1999, www.spmflo.com.
SPM Flow Control, Inc., High-Pressure Long Radius Swivel Joints, 2002, www.spmflo.com.
SPM Flow Control, Inc., Long Radius Swivel Joints, Operating and Maintenance Instructions, 2004.
SPM Flow Control, Inc., Long Radius Swivel Joints, Operating and Maintenance Instructions, 2006.
SPM Flow Control, Inc., Weir SPM, Long Radius Swivel Joints, 2007.
CN OA 2010800253503 mailed Jun. 9, 2013 (8 pages).
SPM "Emergency Relief Valve Brochure" 1997 (4 pages).
EP Search Report mailed Jan. 30, 2013 for EP09838004.1 (4 pages).

(56) References Cited

OTHER PUBLICATIONS

SPM Flow Control, Inc., "Flow Control Products and Drilling Equipment" brochure, Aug. 9, 2011 (28 pages).
HP70-001 OA for U.S. Appl. No. 06/419,141 mailed Nov. 17, 1983 (4 pages).
HP70-006 OA for U.S. Appl. No. 08/643,239 mailed Dec. 30, 1996 (11 pages).
HP70-011 NOA for U.S. Appl. No. 10/690,888 mailed Aug. 29, 2005 (7 pages).
HP70-016 NOA for U.S. Appl. No. 10/833,859 mailed Jul. 6, 2005 (4 pages).
HP70-016 OA for U.S. Appl. No. 10/833,859 mailed Dec. 22, 2004 (5 pages).
HP70-021 NOA for U.S. Appl. No. 11/013,486 mailed Feb. 12, 2007 (4 pages).
HP70-021 NOA for U.S. Appl. No. 11/414,984 mailed Feb. 11, 2009 (8 pages).
HP70-021 OA for U.S. Appl. No. 11/013,486 mailed Aug. 30, 2005 (12 pages).
HP70-022 NOA for U.S. Appl. No. 11/354,663 mailed Jun. 29, 2010 (4 pages).
HP70-022 OA for U.S. Appl. No. 11/354,663 mailed Jan. 8, 2010 (6 pages).
HP70-022 U.S. Appl. No. 60/653,014 (16 pages).
HP70-023 NOA for U.S. Appl. No. 11/638,965 mailed Sep. 23, 2008 (6 pages).
HP70-023 OA for U.S. Appl. No. 11/638,965 mailed Apr. 4, 2008 (10 pages).
HP70-023CA 2612397 NOA mailed Dec. 20, 2012 (1 page).
HP70-029 ISR and WO for PCT/US2009/068822 mailed Aug. 9, 2010 (7 pages).
HP70-029 OA for U.S. Appl. No. 12/642,541 mailed Mar. 19, 2012 (15 pages).
HP70-036 ISR and WO for PCT/US2010/031738 mailed Dec. 27, 2010 (7 pages).
HP70-036 NOA for U.S. Appl. No. 12/763,786 mailed May 16, 2012 (6 pages).
HP70-036 OA for U.S. Appl. No. 12/763,786 mailed Oct. 11, 2011 (9 pages).
HP70-036 U.S. Appl. No. 61/170,917 (9 pages).
HP70-036A OA for U.S. Appl. No. 13/608,562 mailed Sep. 13, 2013 (12 pages).
HP70-036EP Extended SR for EP10767632.2 mailed Mar. 14, 2013 (6 pages).
HP70-036EP SR for EP10767632.2 mailed Mar. 14, 2013 (6 pages).
HP70-037 ISR and WO for PCTUS2010/037156 mailed Jan. 13, 2011 (8 pages).
HP70-037 NOA for U.S. Appl. No. 12/793,194 mailed Feb. 19, 2013 (10 pages).
HP70-037 OA for U.S. Appl. No. 12/793,194 mailed Oct. 25, 2012 (8 pages).
Hp70-039EP Extended SR for EP10784052.2 mailed Jul. 4, 2013 (7 pages).
HP70-039 FOA for U.S. Appl. No. 10/822,900 mailed Aug. 16, 2013 (15 pages).
HP70-039 ISR and WO for PCT/US2010/039834 Feb. 8, 2011 (6 pages).
HP70-039 OA for U.S. Appl. No. 12/822,900 mailed Dec. 6, 2012 (20 pages).
HP70-039 U.S. Appl. No. 61/220,067 (12 pages).
HP70-072 IPRP for PCT/US2012/050376 mailed Jul. 15, 2013 (28 pages).
HP70-072 ISR and WO for PCT/US2012/050376 mailed Oct. 26, 2012 (2 pages).
HP70-072 U.S. Appl. No. 61/522,234 (23 pages).
HP70-714 Design U.S. Appl. No. 29/429,909 (4 pages).
HP70-714 IN Exam Report for IN Design 251691 mailed Jun. 26, 2013 (2 pages).
HP70-715 Design U.S. Appl. No. 29/449,852 (7 pages).
HPHP70-716 Design U.S. Appl. No. 29/449,867 (8 pages).
HP70-720 Design U.S. Appl. No. 29/453,837 (8 pages).
BJ 285959—3 inch 15,000 PSi Popoff Valve, Mar. 26, 2004 (1 page).
Harrisburg, Inc., "Reset Relief Valves" brochure, (c) 1982) (2 pages).

\* cited by examiner

SWIVEL JOINT WITH UNIFORM BALL BEARING REQUIREMENTS

This application claims priority to and the benefit of U.S. Provisional Patent Application No. 60/947,738, filed Jul. 3, 2007, which is incorporated herein by reference

BACKGROUND OF THE INVENTION

1. Technical Field

The present invention relates in general to swivels joints for high pressure well service applications and, in particular, to an improved system, method, and apparatus for swivel joints having uniform ball bearing requirements for all bearing races.

2. Description of Related Art

High pressure well service applications require the use of swivel joints to interconnect various plumbing configurations. A swivel joint has male and female connectors that are joined and sealed, but which permit swivel action between them. Circumferential bearing seats are formed in the male and female connectors to capture ball bearings therebetween to facilitate the swiveling action. Swivel joints are required to perform under extreme conditions, such as handling fluids that contain abrasives that cause erosion of the joint components, high pressures, and extreme temperatures. Although there are workable designs available in the industry, an improved swivel joint design would be desirable.

SUMMARY OF THE INVENTION

Embodiments of a system, method, and apparatus for a swivel Joint having uniform ball bearing requirements for all bearing races are disclosed. The swivel joint has a male connector and a female connector that coaxially interconnect and swivel relative to each other while still maintaining a high pressure seal. Each connector has three bearing races to form three sets of bearing races, each of which supports the same number of ball bearings. The circumferences of the main races are enlarged by less than the diameter of one ball, so it is impossible to add another ball to the coupled male and female connectors of the swivel joint.

For example, the main and center male connector bearing races are formed at one diameter, while the third bearing race is formed at a larger diameter. The female races are formed at complementary configurations. In addition to providing diametric and circumferential dimensional changes, this design also provides an increase in wall thickness for greater erosion resilience.

An increased step in diameter may be formed on the outer diameter of the male connector between the races, with a complementary step in diameter formed on the inner diameter of the female connector between its races. This design results in more support around the main ball races that are closest to the seal ring. This configuration also produces more even distribution of loads and stresses throughout all of the ball races, and provides extended life of the ball races.

One embodiment of the invention also is provided with greater axial separation between the various sets of ball races compared to conventional designs. For example, the axial distance between each set of races is increased. This wider stance between ball races results in a more stable ball race assembly and provides better ball race loading and longer ball race life.

The foregoing and other objects and advantages of the present invention will be apparent to those skilled in the art, in view of the following detailed description of the present invention, taken in conjunction with the appended claims and the accompanying drawings

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
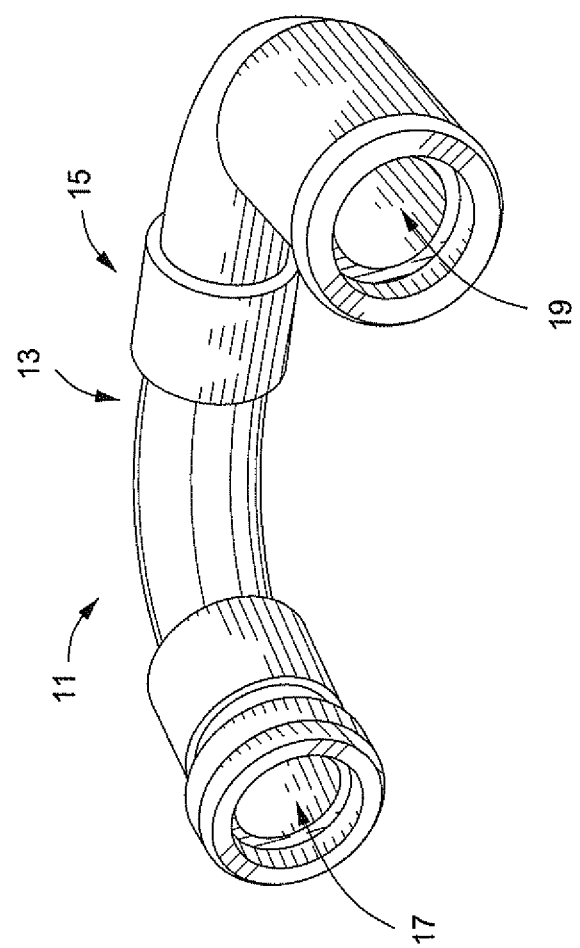
FIG. 1 is an isometric view of one embodiment of a swivel joint constructed in accordance with the invention.
Figure 2:
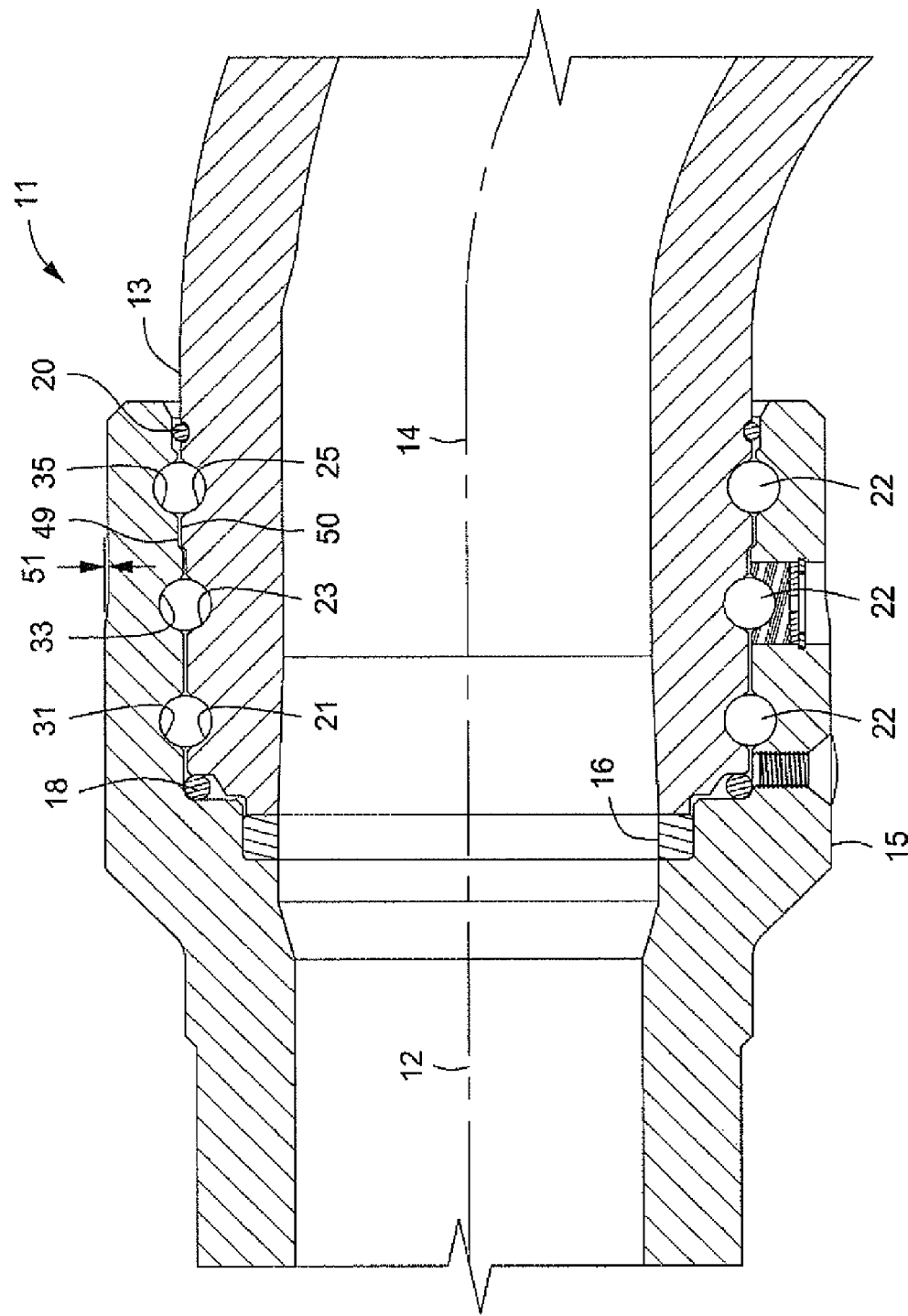
FIG. 2 is a sectional view of the swivel joint of FIG. 1 and is constructed in accordance with the invention.

Referring to FIGS. 1-6, embodiments of a system, method, and apparatus for swivel joints having uniform ball bearing requirements for all bearing races are disclosed. As shown in FIGS. 1 and 2, one type of swivel joint 11 comprises a male connector 13 and a female connector 15 that coaxially interconnect along central axes 12, 14 thereof. The swivel joint 11 also includes connectors 17, 19 for connecting the swivel joint to other well service components (not shown). The swivel joint permits the male and female connectors 13, 15 to swivel about the axes 12, 14 relative to each other while still maintaining a high pressure seal therebetween.

Figure 3:
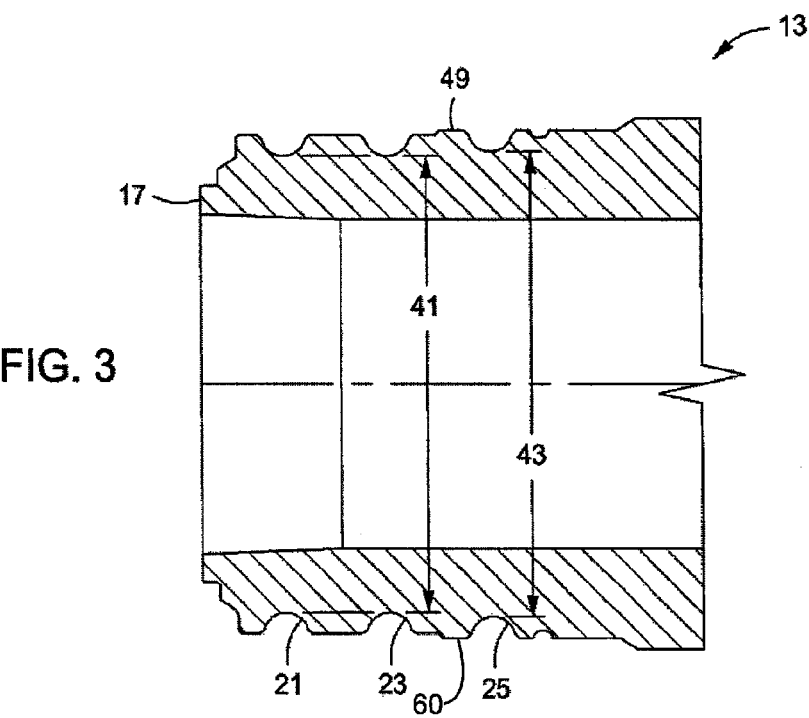
FIG. 3 is a sectional view of one embodiment of a male connector for a swivel joint and is constructed in accordance with the invention.
Figure 4:
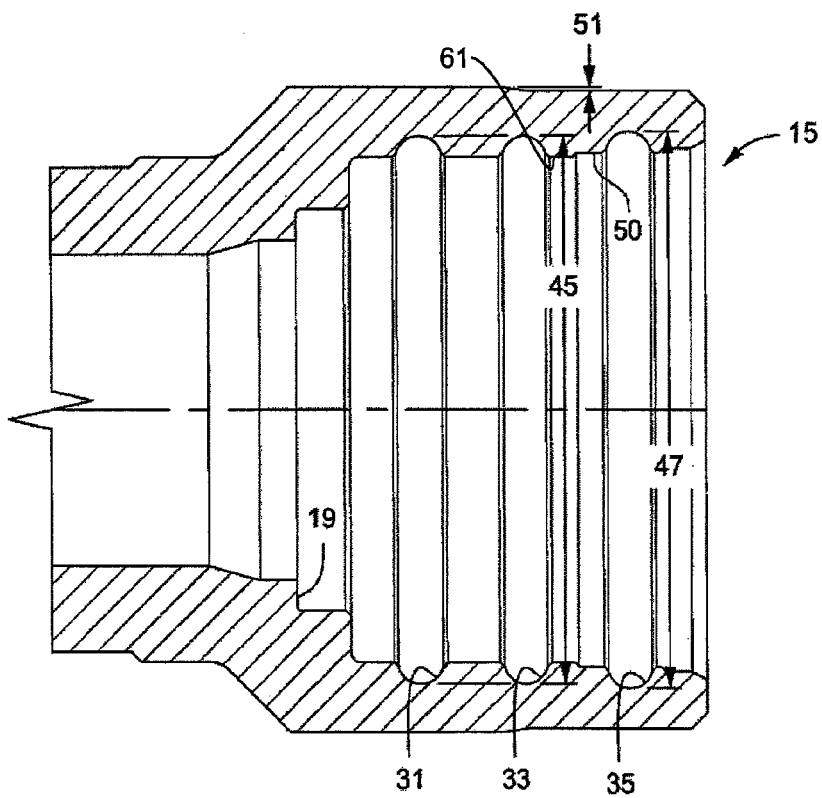
FIG. 4 is a sectional view of one embodiment of a female connector for a swivel joint and is constructed in accordance with the invention.

FIGS. 3 and 4 depict enlarged sectional views of one embodiment of male and female connectors 13, 15, respectively, such as for 3-inch diameter components rated at a working pressure of 15,000 psi. A main seal ring 16 (FIG. 2) for the swivel joint 11 is located between distal end 17 (FIG. 3) of male connector 13, and proximal end 19 (FIG. 4) of female connector 15. As shown in FIG. 2, an o-ring 18 and dust seal 20 also may be provided between connectors 13, 15.

Male connector 13 also has three arcuate recesses or bearing races 21, 23, 25, that are coaxial with and complementary to three arcuate recesses or bearing races 31, 33, 35 located on female connector 15. Thus, when male and female connectors 13, 15 are mated together, three sets of bearing cavities are formed: main set or cavity formed races 21, 31; center set or cavity formed by races 23, 33, and support set or cavity formed by races 25, 35, each of which supports a plurality of ball bearings or balls 22.

In one embodiment, each set of races contains the same number of balls 22. For example, each set of races may be provided with a total of 35 balls, with each ball having a diameter of ⅜-inch. However, the sets of races are not all the same size. For example, although main set races 21, 31 and center set races 23, 33 may be provided with the same diameters, support set races 25, 35 may be provided with larger diameters. With respect to some conventional designs having small main set races, this design may be accomplished by enlarging the diameter and circumference of main set races 21, 31 by a sufficient distance to almost accommodate another ball (e.g., approximately ¾ to ⅞ of the diameter of one ball). Since the circumference of main set races 21, 31 are enlarged by less than the diameter of one ball, it is impossible to add another ball to the coupled male and female connectors 13, 15 of swivel joint 11.

For example, in the embodiment of FIG. 3, the male connector 13 at bearing races 21, 23 is formed at an outer diameter 41 of about 3.843 inches, while the male connector 13 at bearing race 25 is formed at an outer diameter 43 of about 3.903 inches. In a complementary configuration, the female connector 15 at bearing races 31, 33 (FIG. 4) may be formed at an inner diameter 45 of about 4.60 inches, while at bearing race 35, it may be formed at an inner diameter 47 of about 4.66 inches.

In addition to providing diametral and circumferential dimensional changes, this design also provides an increase in wall thickness (i.e., radial direction). In one embodiment, the wall thickness of the male connector 13 is increased by about 13.5% for greater erosion resilience therethrough. As shown in FIGS. 2-4, a step 49 in diameter (i.e., radial thickness of the wall) may be formed on a band 60 on the outer diameter of male connector 13 between races 23, 25, with a complementary shaped step 50 in diameter formed on a band 61 in the inner diameter of female connector 15 between races 33, 35. Step 49 created on band 60 a larger outer diameter portion joining male bearing race 25 and a smaller outer diameter portion joining male bearing race 23, Step 50 creates on band 50 a smaller inner diameter portion joining female bearing race 33 and a larger inner portion joining female bearing race 35.

One embodiment of the invention also is provided with greater axial separation between the various sets of ball races compared to conventional designs. For example, on the male connector 13 (FIG. 3), the axial distance between ball races 21 and 23 is increased to at least about 0.88 inches, as is the axial distance between ball races 23 and 25. Complementary dimensions are formed on the female connector 15. This wider stance between ball races results in a more stable ball race assembly and provides better ball race loading and longer ball race life.

Referring now to FIGS. 2 and 4, the female connector 15 may be provided with an outer diameter configuration that includes a step 51 in radial thickness of the wall. For example, in the embodiment shown, the step 51 is located adjacent the center race 33. The wall of connector 15 is thicker and has a larger diameter (e.g., approximately 5.41 inches) about main race 31, and a smaller diameter (e.g., approximately 5.34 inches) about support race 35. This design results in more support around the main ball races that are closest to the seal ring 16 (FIG. 2). This configuration also produces more even distribution of loads and stresses throughout all of the ball races, and provides extended life of the ball races.

Figure 5:
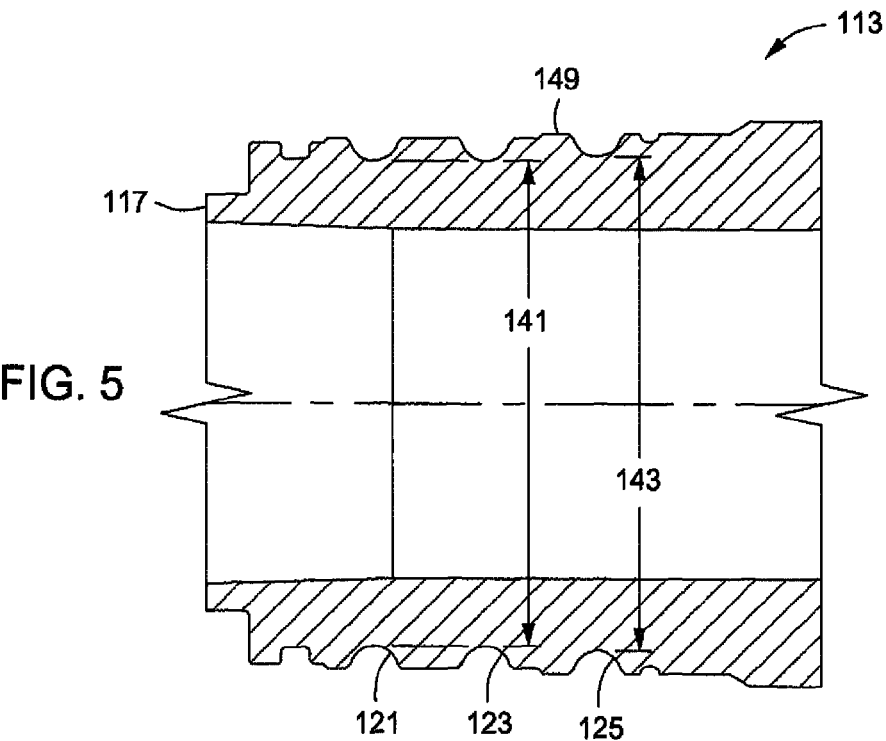
FIG. 5 is a sectional view of another embodiment of a male connector for a swivel joint and is constructed in accordance with the invention.
Figure 6:
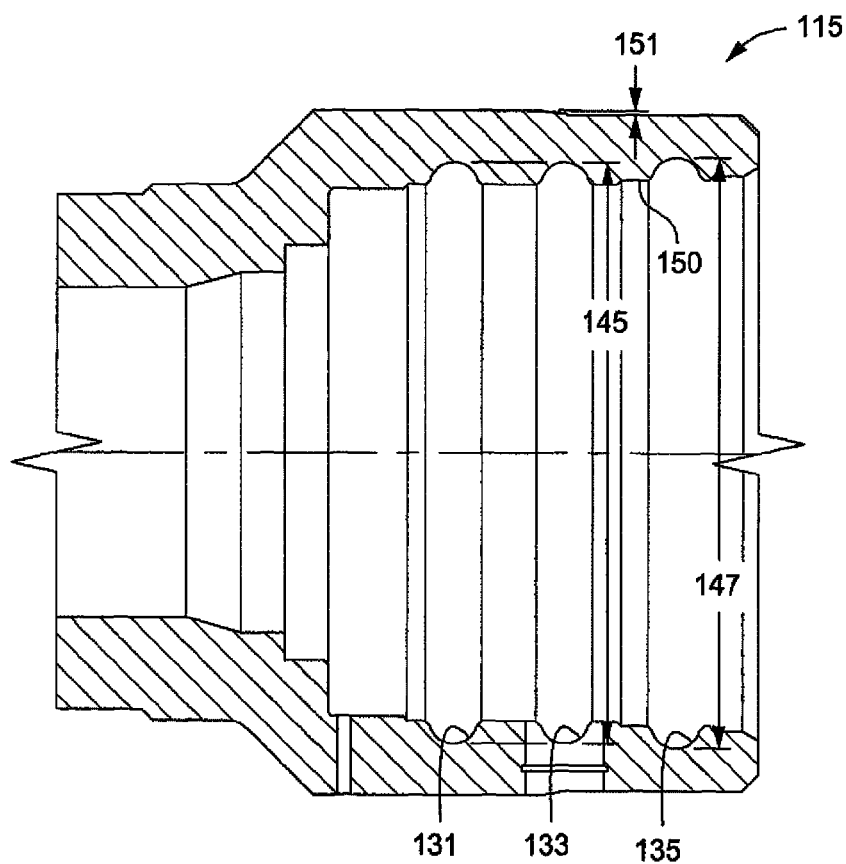
FIG. 6 is a sectional view of another embodiment of a female connector for a swivel joint and is constructed in accordance with the invention.

Referring now to FIGS. 5 and 6, another embodiment of male and female connectors 113, 115, such as for 4-inch diameter components rated at a working pressure of 10,000 psi is shown. This embodiment and the previously described embodiment share many features and elements, including the requirement that each race contain the same number of balls. For example, each set of races may be provided with a total of 32 balls, with each ball having a diameter of ½-inch.

Similarly, the sets of races are not all the same size. The main races 121, 131 and center races 123, 133 may be provided with the same respective diameters, and support races 125, 135 may be provided with larger respective diameters. This design may be accomplished by enlarging the diameter and circumference of main races 121, 131 by a sufficient distance to almost accommodate another ball. Since the circumferences of the main races 121, 131 are enlarged by less than the diameter of one ball, it is impossible to add another ball to the coupled male and female connectors 113, 115 of the swivel joint.

For example, in the embodiment of FIG. 5, the male connector races 121, 123 are formed at a diameter 141 of about 4.637 inches, while support race 125 is formed at a diameter 143 of about 4.727 inches. In a complementary configuration, the female connector races 131, 133 (FIG. 6) may be formed at a diameter 145 of about 5.647 inches, while support race 135 may be formed at a diameter 147 of about 5.737. This design also provides an increase in wall thickness of about 22.7% in one embodiment of the male connector 113. A step 149 in diameter (i.e., radial thickness of the wall) may be formed on the outer diameter of male connector 113 between races 123, 125, with a complementary step 150 in diameter formed on the inner diameter of female connector 115 between races 133, 135.

The female connector 115 also may be provided with an outer diameter configuration that includes a step 151 (FIG. 6) in radial thickness of the wall. For example, in the embodiment shown, the step 151 is located adjacent the center race 133. The wall of connector 115 is thicker and has a larger diameter (e.g., approximately 6.56 inches) about main race 131, and a smaller diameter (e.g., approximately 6.44 inches) about support race 135.

While the invention has been shown or described in only some of its forms, it should be apparent to those skilled in the art that it is not so limited, but is susceptible to various changes without departing from the scope of the invention.

What is claimed is:

1. In combination with a swivel joint forming a flow passage and having a central axis, the improvement comprising:
   a hollow tubular male connector having a first end, an annular outer surface having a main bearing race, a center bearing race, and a support bearing race, wherein each of the main, center and support bearing races having an arcuate cross-section of a same radius, and wherein the main bearing race's diameter relative to the central axis being the same as the center bearing race's diameter and less than the support bearing race's diameter, the support bearing race being furthest from the first end than the main and center bearing races and the main bearing race being closest to the first end;
   a hollow tubular female connector having corresponding female main bearing race, female center bearing race, and female support bearing race adapted to receive and fit around the outer surface and the main bearing race, the center bearing race, and the support bearing race of the male connector to respectively form main, center, and support bearing cavities having a substantial circular cross section of the same cross sectional diameter;
   a raised step circumscribing the male connector between the support bearing race and center bearing race, the raised step defining a change of diameter with respect to the central axis to increase the male connector's wall thickness near the male support bearing race;
   a recess step in the female connector, the recess step corresponding to the raised step and increasing the female connector's wall thickness near the female main bearing race and the female center bearing race; and a same number of balls having a same outer diameter in each of the main, center, and support bearing cavities, such that the support bearing cavity holds the same number of balls to a full capacity that no additional ball of the same outer diameter can be placed into each of the main, center, and support bearing cavities, wherein the same number of balls being supported only by the races and themselves.

* * * * *